United States Patent
Higashino et al.

(10) Patent No.: US 9,161,261 B2
(45) Date of Patent: Oct. 13, 2015

(54) COMMUNICATION SPEED CONTROL SYSTEM

(75) Inventors: Yoshiaki Higashino, Tokyo (JP); Toshihiro Sano, Tokyo (JP); Noriyuki Haneda, Tokyo (JP); Takuya Sakai, Tokyo (JP)

(73) Assignee: ACTIS CORPORATION, Tokyo (JP)

( * ) Notice: Subject to any disclaimer, the term of this patent is extended or adjusted under 35 U.S.C. 154(b) by 76 days.

(21) Appl. No.: 14/241,001

(22) PCT Filed: Jun. 25, 2012

(86) PCT No.: PCT/JP2012/066176
§ 371 (c)(1),
(2), (4) Date: Feb. 25, 2014

(87) PCT Pub. No.: WO2013/035416
PCT Pub. Date: Mar. 14, 2013

(65) Prior Publication Data
US 2014/0204756 A1    Jul. 24, 2014

(30) Foreign Application Priority Data

Sep. 9, 2011 (JP) .................................. 2011-197490

(51) Int. Cl.
*H04W 28/02* (2009.01)
*H04M 15/00* (2006.01)
(Continued)

(52) U.S. Cl.
CPC ....... *H04W 28/0257* (2013.01); *H04L 12/1435* (2013.01); *H04L 41/0896* (2013.01); *H04L 41/5019* (2013.01); *H04L 43/026* (2013.01);
(Continued)

(58) Field of Classification Search
None
See application file for complete search history.

(56) References Cited

U.S. PATENT DOCUMENTS 7,433,943 B1 * 10/2008 Ford .............................. 709/223
7,738,377 B1 * 6/2010 Agostino et al. .............. 370/233
2008/0049745 A1 * 2/2008 Edwards et al. .............. 370/389

(Continued)

FOREIGN PATENT DOCUMENTS

JP    2007-129401 A    5/2007
JP        4911737 B1    4/2012
WO   2010/122986 A1   10/2010

OTHER PUBLICATIONS

International Search Report dated Jul. 31, 2012 issued in corresponding application No. PCT/JP2012/066176.
"Comparing speed limits of smartphones from different carriers", Internet URL: http://japan.cnet.com/mobile/35006197/Retrieval Date: Sep. 1, 2011.

*Primary Examiner* — Chirag Shah
*Assistant Examiner* — Suk Jin Kang
(74) *Attorney, Agent, or Firm* — Westerman, Hattori, Daniels & Adrian, LLP

(57) ABSTRACT

A communication speed control system to be placed between service providing servers on the Internet and smartphones, the communication speed control system including: a traffic storing unit a non-regulated IP address storing unit for registering IP addresses of the servers a packet reading unit for extracting an IP address of the server from the packet; a traffic management unit for calculating cumulative data traffic of the IP address in question a handling rule management unit for determining that a band limitation is required when the cumulative data traffic exceeds a threshold value and the IP address in question is not registered as a non-regulated IP address, and determining that a band limitation is not required when the cumulative data traffic does not exceed the threshold value and a packet transmission unit for transmitting a packet at a normal communication speed.

2 Claims, 4 Drawing Sheets

(51) Int. Cl.
*H04L 12/24* (2006.01)
*H04L 12/26* (2006.01)
*H04L 12/14* (2006.01)

(52) U.S. Cl.
CPC ............ *H04L 43/0876* (2013.01); *H04M 15/50* (2013.01); *H04M 15/51* (2013.01); *H04M 15/8083* (2013.01); *H04L 12/1485* (2013.01); *H04L 41/0893* (2013.01); *H04L 43/028* (2013.01); *H04L 43/04* (2013.01); *H04L 43/062* (2013.01); *H04M 2215/0192* (2013.01)

(56) References Cited

U.S. PATENT DOCUMENTS

| | | | |
|---|---|---|---|
| 2008/0049769 A1* | 2/2008 | Bugenhagen | 370/401 |
| 2009/0059812 A1* | 3/2009 | Chinnaswamy et al. | 370/253 |
| 2010/0188990 A1* | 7/2010 | Raleigh | 370/252 |
| 2010/0188991 A1* | 7/2010 | Raleigh | 370/252 |
| 2010/0192170 A1* | 7/2010 | Raleigh | 725/1 |
| 2010/0192212 A1* | 7/2010 | Raleigh | 726/7 |
| 2010/0198698 A1* | 8/2010 | Raleigh et al. | 705/26 |
| 2011/0058575 A1 | 3/2011 | Oshima | |

\* cited by examiner

COMMUNICATION SPEED CONTROL SYSTEM

TECHNICAL FIELD

The present invention relates to a communication speed control system, and more particularly to a technique which, when an cumulative value of traffic from individual mobile phones to a specific connection destination exceeds a given limit, suppresses communication speeds between the connection destination and all the mobile phones.

BACKGROUND ART

In recent years, smartphones, which are multi-function mobile phones with PDA functionality, have become widespread, and data traffic of individual users continues to increase correspondingly, beginning to cause problems that communication common carriers (carriers) cannot keep up with it by facility enhancement.

Many users subscribe to a fixed communication fee plan commonly called "Unlimited Packet Discount" when they start using smartphones. They can view websites and video sites without worrying about the fee, which results in accelerating the increase of data traffic.

Meanwhile, it is also a fact that there are great differences between individuals in terms of the amount of data traffic, and an exceptionally large amount of use by some heavy users is increasing the overall traffic. Therefore, if the fixed fee is raised as a last resort to cover the cost of facility enhancement, it would cause unfairness among the users.

For this reason, some carriers are beginning to take a measure to suppress the overall data traffic by individually imposing a band limitation on users who have performed extremely large amount of data communication (see Non Patent Literature 1).

CITATION LIST

Non Patent Literature

NPL 1: Comparing speed limits of smartphones from different carriers
Retrieval Date: Sep. 1, 2011

SUMMARY OF INVENTION

Technical Problem

It is true that the above-mentioned band limitation on specific users can suppress data traffic due to the heavy users, and it is also possible to remove a sense of unfairness among the users.

However, on the other hand, it has been open to criticism for being unjust in that only the users side should be subject to the regulation, in spite of the fact that there is always a counterpart (such as a website) in communication and extremely concentrated access to specific websites greatly impacts the capacity of the carriers.

For example, in the case of video distribution sites, they get many users by providing services, such as uploading videos taken with the smartphones over the 3G network, and distributing a stream of video files stored on the server side to the smartphones over the 3G network, while they collect a large amount of advertisement fee from sponsors by providing an advertisement space on a video replay screen.

Further, in the case of storage service sites, they provide services, such as allowing users to download files, which have been uploaded to the server side from PCs, etc., to the users' smartphones over the 3G network, and allowing users to upload photographic images taken with the smartphones over the 3G network, and they collect membership fees (such as monthly fees) from the individual users in exchange therefor.

Otherwise, in the case of shopping sites, they distribute product catalog information to the smartphones over the 3G network, and when an order is established they earn a commission for the sale via credit card payment, etc.

In other words, the major service sites on the Internet bear no cost for the carriers, but rather contribute to the shortage of facility, in spite of the fact that they get many users via the smartphones, which enhances their value as advertising media, and enables them to earn profit from membership fees, sales commissions, etc. Further, there has been unfairness between the general users and the service providers because the cost to the carrier for facility enhancement will be finally recovered by passing it on to the fees paid by the individual users.

The present invention is devised in view of the current problem, and an object thereof is to provide a technique which makes it possible to indirectly urge the major connection destinations of data communication by mobile phones to pay a facility usage fee to the carrier.

Solution to Problem

In order to achieve the above-described object, the communication speed control system is a communication speed control system to be placed between a plurality of service providing servers arranged on the Internet and a plurality of mobile phones associated with a specific carrier, the communication speed control system including: traffic storing means in which data traffic between the individual mobile phones and the individual service providing servers is successively stored in association with IP addresses of the service providing servers; non-regulated IP address storing means for registering the IP addresses of specific service providing servers as non-regulated IP addresses in advance; means for, when a packet is exchanged between a specific service providing server and a specific mobile phone, extracting an IP address of the service providing server from the packet; means for calculating cumulative data traffic associated with the extracted IP address by reference to the traffic storing means; means for, when this cumulative data traffic exceeds a predetermined threshold value, checking whether or not the IP address in question is registered as a non-regulated IP address by reference to the non-regulated IP address storing means; means for determining that a band limitation is required when the cumulative data traffic associated with the IP address exceeds the threshold value and the IP address in question is not registered as a non-regulated IP address in the non-regulated IP address storing means, and determining that the band limitation is not required when the cumulative data traffic does not exceed the threshold value, or when the IP address in question is a non-regulated IP address even if the cumulative data traffic exceeds the threshold value; and means for transmitting a packet toward a destination at a normal communication speed when the band limitation is not required, and transmitting the packet toward the destination at a slower speed than normal when the band limitation is required.

The communication speed control system further including communication log acquisition means for successively storing date and time of the packet transmission, the data traffic, and the IP address of the service providing server in the traffic storing means.

Advantageous Effects of Invention

According to the communication speed control system of the present invention, for the service providing server having cumulative data traffic exceeding a predetermined value, the communication speed between the server and the individual mobile phones will be suppressed as long as its IP address is not registered in the non-regulated IP address storing means.

As a result, the service provider will be swamped with complaints from the mobile phone users. Therefore, it can be expected that, in order to relieve this situation, the service provider may wish to register its IP address in the non-regulated IP address storing means even at the cost of a prescribed compensation.

DESCRIPTION OF EMBODIMENTS

Figure 1:
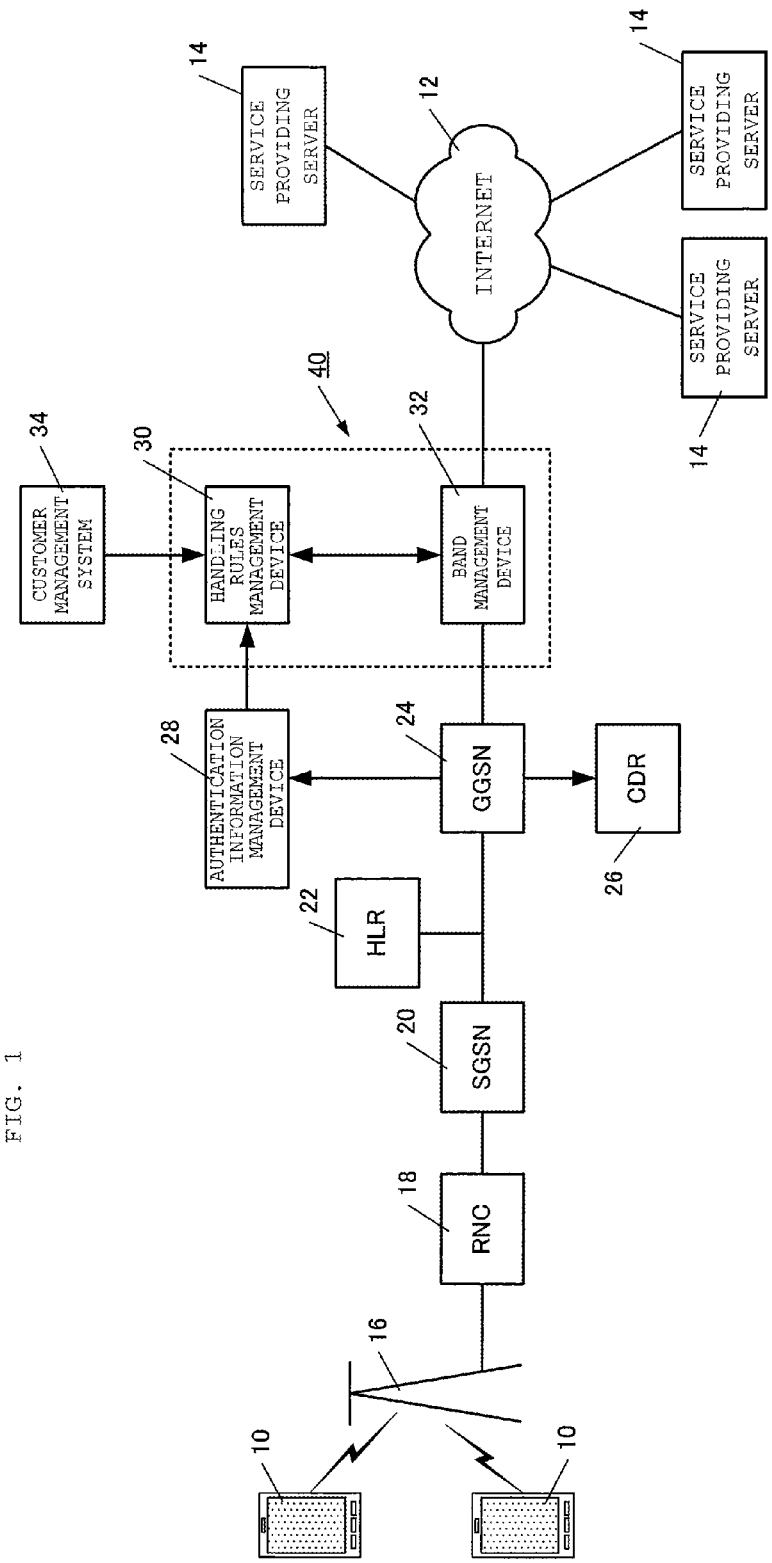
FIG. 1 is an explanatory diagram illustrating a network configuration of a carrier to which the present invention may be applied.

FIG. 1 illustrates a network configuration of a carrier which is formed between smartphones 10 possessed by users and various service providing servers 14 installed on the Internet 12, depicting a radio base station 16, an RNC (Radio Network Controller) 18, an SGSN (Serving GPRS Support Node/packet access control node) 20, an HLR (Home Location Register) 22, a GGSN (Gateway GPRS Support Node/relay packet switch) 24, a CDR (Call Detail Record) 26, an authentication information management device 28, a handling rules management device (PCRF/Policy and Charging Rules Function) 30, a band management device (DPI/Deep Packet Inspection) 32, and a customer management system 34.

Here, when the individual user requests connection to the service providing server 14 from a Web browser built in the smartphone 10, the SGSN 20 is reached via the radio base station 16 and the RNC 18.

This SGSN 20 compares authentication information registered in the HLR 22 and SIM information transmitted from the smartphone 10 so as to identify the destination GGSN 24.

The GGSN 24 assigns an IP address to that smartphone 10, and registers correspondence information between that IP address and the phone number in the authentication information management device 28.

Thereafter, communication is started with the destination service providing server 14 via the band management device 32, while the communication between the smartphone 10 and the service providing server 14 is managed with this IP address.

Further, the handling rules management device 30 can retrieve the phone number of the connection source (smartphone 10) by making an inquiry to the authentication information management device 28, and, based on this information, elicit the user's attribute information from the customer management system 34.

The GGSN 24 sequentially stores communication information (phone number, source IP address, destination IP address, communication time, etc.) in the CDR 26.

Among the above-described components, the handling rules management device 30 and the band management device 32 configure a communication control system 40 of the present invention.

Figure 2:
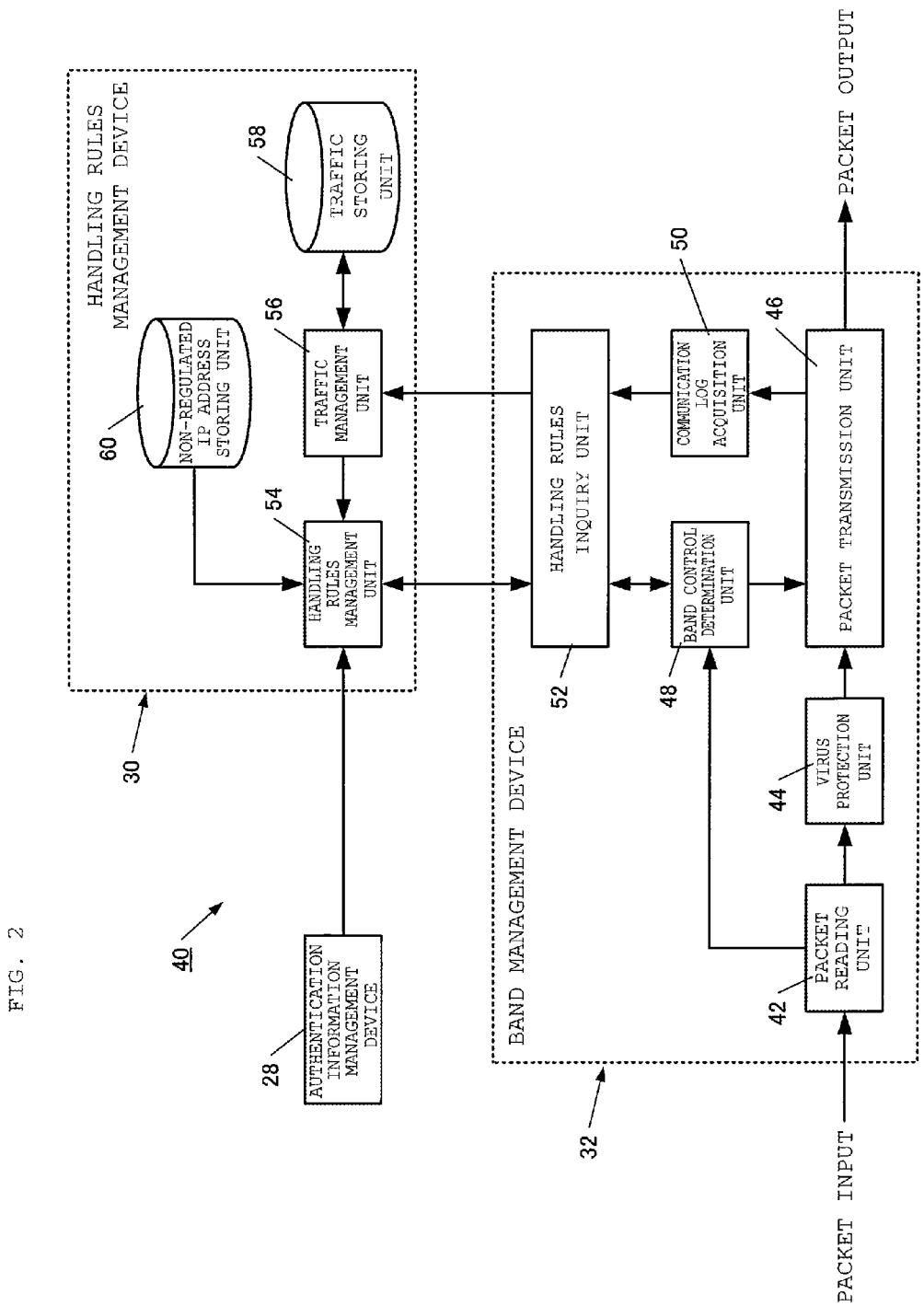
FIG. 2 is a block diagram showing a functional configuration of a communication control system according to the present invention.

FIG. 2 is a block diagram showing a functional configuration of the handling rules management device 30 and the band management device 32.

The band management device 32 includes at least a packet reading unit 42, a virus protection unit 44, a packet transmission unit 46, a band control determination unit 48, a communication log acquisition unit 50, and a handling rules inquiry unit 52. These packet reading unit 42, virus protection unit 44, packet transmission unit 46, band control determination unit 48, communication log acquisition unit 50, and handling rules inquiry unit 52 are implemented when a CPU of the band management device 32 performs necessary processes according to a dedicated program.

The handling rules management device 30 includes at least a handling rules management unit 54, a traffic management unit 56, a traffic storing unit 58, and a non-regulated IP address storing unit 60. The handling rules management unit 54 and the traffic management unit 56 are implemented when the CPU of the handling rules management device 30 performs necessary processes according to a dedicated program. In addition, the traffic storing unit 58 and the non-regulated IP address storing unit 60 are provided in a memory of the handling rules management device 30 or in external storage.

Figure 3:
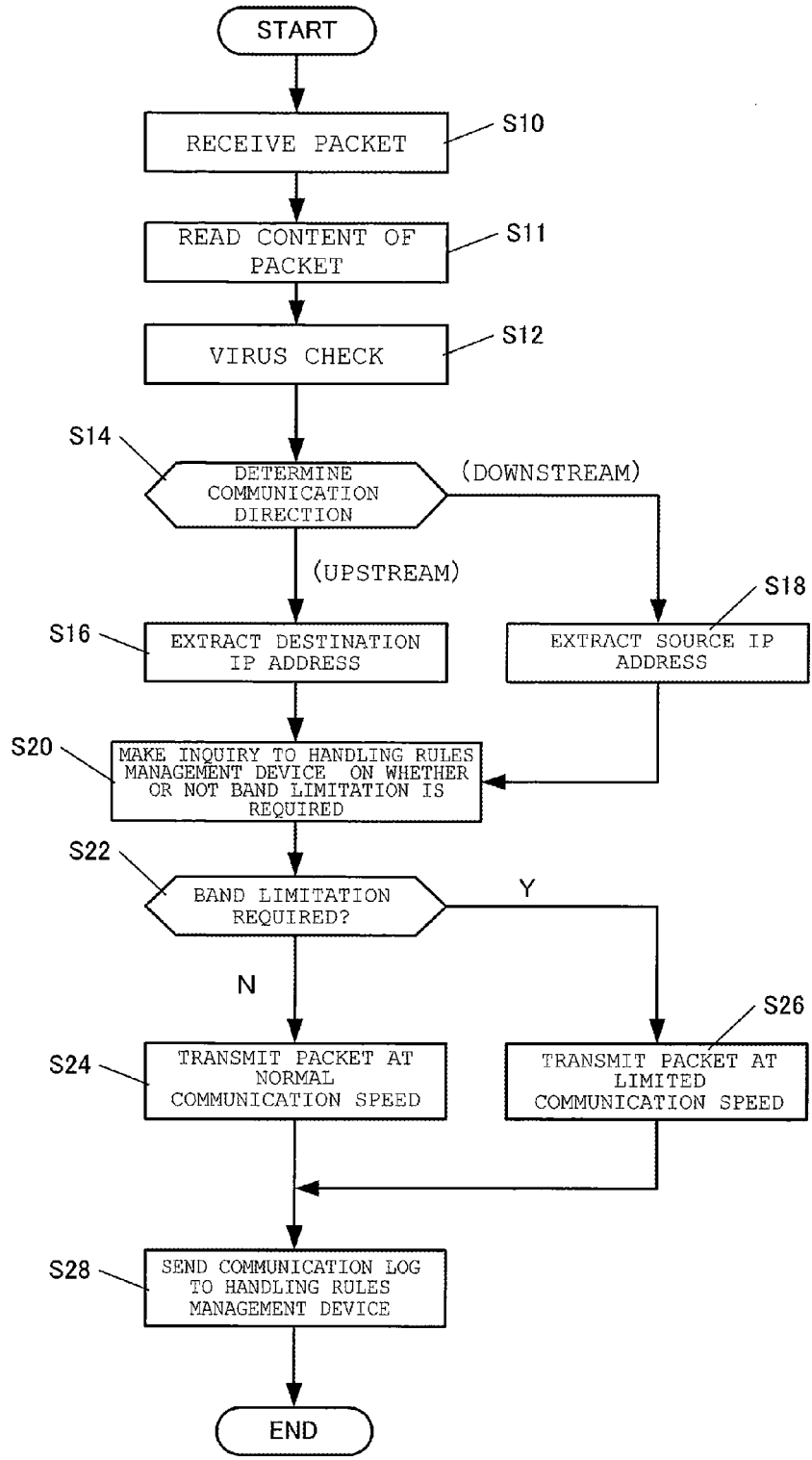
FIG. 3 is a flowchart showing a processing procedure in a band management device.
Figure 4:
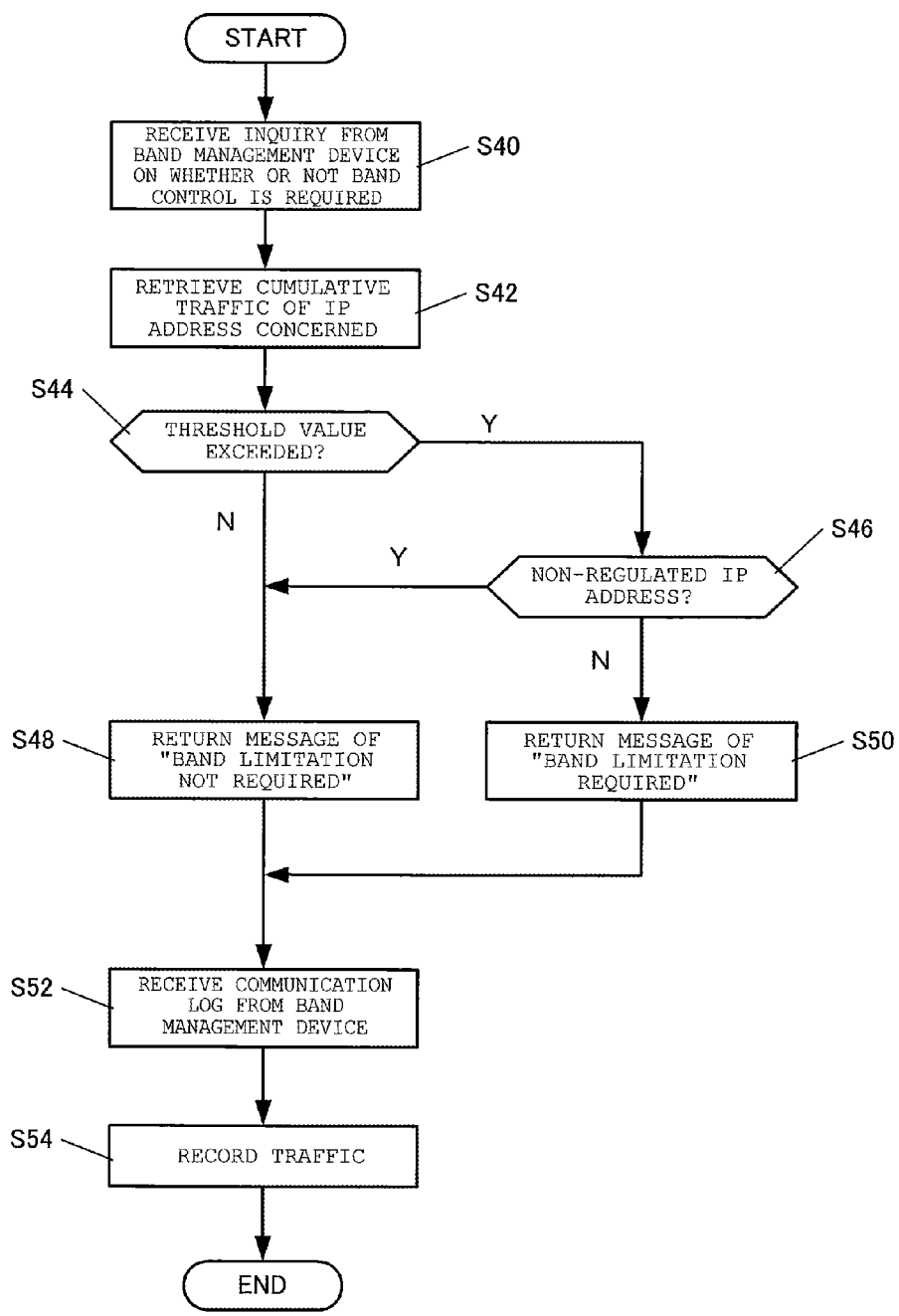
FIG. 4 is a flowchart showing a processing procedure in a handling rules management device.

Hereinafter, a description will be given of processing procedures in this system 40 following the flowcharts in FIG. 3 and FIG. 4.

First, when the band management device 32 receives a packet transmitted from the smartphone 10, via the GGSN 24 (S10 in FIG. 3), not only the header of the packet but also its data part are read by the packet reading unit 42 (S11), and a virus check is performed in the virus protection unit 44 (S12).

Next, the band control determination unit 48 determines a communication direction of the packet in question (S14).

In this case, as the communication is in an upstream communication direction from the smartphone 10 toward the service providing server 14 on the Internet, the band control determination unit 48 extracts a destination IP address stored in the packet (S16).

Next, the band control determination unit 48 makes an inquiry to the handling rules management device 30 on whether or not a band limitation is required for the destination in question, via the handling rules inquiry unit 52 serving as an interface (S20).

The handling rules management unit 54, on receipt of this inquiry (S40 in FIG. 4), passes the aforementioned destination IP address to the traffic management unit 56 and retrieves the cumulative traffic (S42).

More specifically, since records, which include at least the following data items: IP address, communication starting date and time, communication ending date and time, and data traffic, have been successively stored in the traffic storing unit 58 on a session basis, the traffic management unit 56 aggregates the data traffic at the domain level using the aforementioned destination IP address as a key, and returns an aggregate value (cumulative traffic) to the handling rules management unit 54.

Next, the handling rules management unit 54 determines whether or not this cumulative traffic exceeds a predetermined threshold value (S44).

Then, if the cumulative traffic exceeds the threshold value (S44/Y), the handling rules management unit 54 determines whether or not the IP address in question is a non-regulated IP address by reference to the non-regulated IP address storing unit 60 (S46).

More specifically, the non-regulated IP address storing unit 60 is storing means for registering IP addresses of service providers who have previously made a contract with the carrier to bear the facility usage fee, and if the destination IP address in question is registered here as a non-regulated IP address (S46/Y), the handling rules management unit 54 generates a message of "band limitation not required" and sends it back to the band management device 32 (S48).

In addition, if the cumulative traffic of the destination IP address is at or below the aforementioned threshold value (S44/N), the handling rules management unit 54 also generates the message of "band limitation not required" and sends it back to the band management device 32 (S48).

On the other hand, if the cumulative traffic of the destination IP address exceeds the aforementioned threshold value and the IP address in question is not registered as a non-regulated IP address (S46/N), the handling rules management unit 54 generates a message of "band limitation required" and sends it back to the band management device 32 (S50).

The band control determination unit 48, on receipt of the message of "band limitation required" from the handling rules management device 30 (S22/Y in FIG. 3), commands the packet transmission unit 46 to transmit the packet at a limited communication speed.

The packet transmission unit 46, on receipt of this packet, transmits the packet in question toward the destination service providing server 14 at a significantly slower communication speed than normal (for example, 192 Kbps at most) (S26).

On the other hand, the band control determination unit 48, when having received the message of "band limitation not required" from the handling rules management device 30 (S22/N), commands the packet transmission unit 46 to transmit the packet without a limitation on the speed. The packet transmission unit 46, on receipt of this packet, transmits the packet in question toward the service providing server 14 at a normal communication speed (for example, best effort: 5.7 Mbps) (S24).

After the packet transmission is completed, the present communication log information (source IP address, destination IP address, data traffic, sending date and time, etc.) is extracted by the communication log acquisition unit 50 and sent to the handling rules management device 30 via the handling rules inquiry unit 52 (S28).

The traffic management unit 56, on receipt of this communication log information (S52 in FIG. 4), retrieves the destination IP address, the data traffic, and the date and time from the communication log and stores them in the traffic storing unit 58 (S54).

Though the above-described description is given of the upstream communication direction going from the smartphone 10 toward the service providing server 14, the band management device 32 and the handling rules management device 30 perform similar processes as well in the case of a downstream communication direction going from the service providing server 14 toward the smartphone 10 (S14/downstream).

More specifically, the band control determination unit 48 extracts the source IP address stored in the packet (S18 in FIG. 3), and makes an inquiry to the handling rules management device 30 on whether or not a band limitation is required for the source in question, via the handling rules inquiry unit 52 (S20).

The handling rules management unit 54, on receipt of this inquiry (S40 in FIG. 4), passes this source IP address to the traffic management unit 56 and retrieves the cumulative traffic (S42).

Next, depending on whether or not this cumulative traffic exceeds a predetermined threshold value (S44), and further, when the cumulative traffic exceeds the threshold value, on whether or not the source IP address in question is a non-regulated IP address (S46), the handling rules management unit 54 sends a message of "band limitation not required" or "band limitation required" to the band management device (S48 or S50).

Then, the band control determination unit 48, on receipt of the message of "band limitation required" from the handling rules management device 30 (S22/Y in FIG. 3), commands the packet transmission unit 46 to transmit the packet at a limited communication speed, and the packet transmission unit 46 transmits that packet toward the smartphone 10 at a very low communication speed (for example, 192 Kbps at most) (S26).

On the other hand, the band control determination unit 48, when having received the message of "band limitation not required" from the handling rules management device 30 (S22/N), commands the packet transmission unit 46 to transmit the packet without a limitation on the speed, and the packet transmission unit 46 transmits that packet toward the smartphone 10 at a normal communication speed (for example, best effort: 7.2 Mbps) (S24).

Further, after the packet transmission is completed, the present communication log information (source IP address, destination IP address, data traffic, sending date and time, etc.) is extracted by the communication log acquisition unit 50 and sent to the handling rules management device 30 via the handling rules inquiry unit 52 (S28).

The traffic management unit 56, on receipt of this communication log information (S52 in FIG. 4), retrieves the source IP address, the data traffic, and the date and time from the communication log and stores them in the traffic storing unit 58 (S54).

According to the communication control system 40 of the present invention, the communication speed between the service providing server 14 having cumulative traffic exceeding the predetermined cumulative traffic and the individual smartphones 10 is extremely suppressed by the packet transmission unit 46 of the band management device 32, as described above, so that the service providers will be swamped with complaints from the users.

It can be expected that, in order to address this situation, the service providers will make a contract with the carrier to bear the facility usage fee, etc. so as to register the IP addresses of their servers in the non-regulated IP address storing unit 60.

Further, if the major service provider's side comes to bear part of the cost for facility enhancement as just described, the fees for end users can be lowered correspondingly.

Though, in FIG. 1, the 3G network is illustrated as a network configuration of the carrier, the present invention is not limited to this configuration, but is obviously also applicable to network architectures such as LTE (Long Term Evolution), ADSL (Asymmetric Digital Subscriber Line), and dial-up.

Further, though, in the above-described description, the example is shown in which the communication speed control system 40 is constituted by the handling rules management device 30 and the band management device 32, the hardware configuration is not limited to this example. For example, the communication control system 40 may also be constituted by a single device, or by three or more network-connected devices.

REFERENCE SIGNS LIST

10 smartphone
12 Internet
14 service providing server
16 radio base station
28 authentication information management device
30 handling rules management device
32 band management device
34 customer management system
40 communication control system
42 packet reading unit
44 virus protection unit
46 packet transmission unit
48 band control determination unit
50 communication log acquisition unit
52 handling rules inquiry unit
54 handling rules management unit
56 traffic management unit
58 traffic storing unit
60 non-regulated IP address storing unit

The invention claimed is:

1. A communication speed control system to be placed between a plurality of service providing servers arranged on the Internet and a plurality of mobile phones associated with a specific carrier, the communication speed control system comprising:
    traffic storing means in which data traffic between the individual mobile phones and the individual service providing servers is successively stored in association with IP addresses of the service providing servers;
    non-regulated IP address storing means for registering the IP addresses of specific service providing servers as non-regulated IP addresses in advance;
    means for, when a packet is exchanged between a specific service providing server and a specific mobile phone, extracting an IP address of the service providing server from the packet;
    means for calculating cumulative data traffic associated with the extracted IP address by reference to the traffic storing means;
    means for, when this cumulative data traffic exceeds a predetermined threshold value, checking whether or not the IP address in question is registered as a non-regulated IP address by reference to the non-regulated IP address storing means;
    means for determining that a band limitation is required when the cumulative data traffic associated with the IP address exceeds the threshold value and the IP address in question is not registered as a non-regulated IP address in the non-regulated IP address storing means, and determining that the band limitation is not required when the cumulative data traffic does not exceed the threshold value, or when the IP address in question is a non-regulated IP address even if the cumulative data traffic exceeds the threshold value; and
    means for transmitting a packet toward a destination at a normal communication speed when the band limitation is not required, and transmitting the packet toward the destination at a slower speed than normal when the band limitation is required.

2. The communication speed control system of claim 1, further comprising communication log acquisition means for successively storing date and time of the packet transmission, the data traffic, and the IP address of the service providing server in the traffic storing means.

* * * * *